US012669897B2

(12) United States Patent
Park et al.

(10) Patent No.: US 12,669,897 B2
(45) Date of Patent: Jun. 30, 2026

(54) DISPLAY DEVICE, OPERATING METHOD THEREOF, AND ELECTRONIC DEVICE INCLUDING THE SAME

(71) Applicant: Samsung Display Co., LTD., Yongin-si (KR)

(72) Inventors: Sang Hun Park, Yongin-si (KR); Young Min Park, Yongin-si (KR); Yong Sub So, Yongin-si (KR); Bo Hwan Lee, Yongin-si (KR); Ho Eung Lee, Yongin-si (KR); Byeong Kyu Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/036,828

(22) Filed: Jan. 24, 2025

(65) Prior Publication Data

US 2025/0264962 A1 Aug. 21, 2025

(30) Foreign Application Priority Data

Feb. 16, 2024 (KR) ........................ 10-2024-0022612

(51) Int. Cl.
*G06F 3/041* (2006.01)
*G06F 3/044* (2006.01)

(52) U.S. Cl.
CPC .......... *G06F 3/0418* (2013.01); *G06F 3/0446* (2019.05)

(58) Field of Classification Search
CPC .... G06F 3/0418; G06F 3/0446; G06F 3/0412; G06F 3/044; G01K 1/02
See application file for complete search history.

(56) References Cited

U.S. PATENT DOCUMENTS

| | | | |
|---|---|---|---|
| 8,884,917 B2 | 11/2014 | Seo | |
| 9,619,080 B2 * | 4/2017 | Iwamoto | G06F 3/0418 |
| 10,564,686 B2 * | 2/2020 | Lee | G06F 1/325 |
| 2006/0028890 A1 * | 2/2006 | Lee | G11C 11/22 365/189.11 |
| 2013/0057514 A1 * | 3/2013 | Murphy | G06F 1/3262 345/174 |
| 2016/0116952 A1 * | 4/2016 | Lee | G06F 3/0346 700/299 |
| 2017/0060301 A1 * | 3/2017 | Li | G06F 3/044 |
| 2018/0260066 A1 * | 9/2018 | Chen | G06F 3/044 |
| 2019/0361570 A1 * | 11/2019 | Takagi | G06F 3/04162 |
| 2020/0033969 A1 * | 1/2020 | Luo | G06F 3/04186 |
| 2020/0201459 A1 * | 6/2020 | Withers | G06F 3/047 |

(Continued)

FOREIGN PATENT DOCUMENTS

KR 10-1747731 B1 6/2017

*Primary Examiner* — Amy Onyekaba
(74) *Attorney, Agent, or Firm* — Womble Bond Dickinson (US) LLP

(57) ABSTRACT

Disclosed are a display device, an operating method thereof, and an electronic device including the same. The display device includes: a sensor unit including first sensors and second sensors; and a sensor driver configured to control the sensor unit, wherein the sensor driver includes: a change rate calculator configured to calculate a first mutual capacitance of the sensor unit, and calculate a change rate corresponding to the first mutual capacitance; and a threshold calculator configured to generate a threshold by applying the change rate to a reference threshold.

20 Claims, 11 Drawing Sheets

(56)                    References Cited

U.S. PATENT DOCUMENTS

| | | | |
|---|---|---|---|
| 2021/0043693 A1* | 2/2021 | Kim | G06F 3/0446 |
| 2021/0286473 A1* | 9/2021 | Park | G06F 3/0446 |
| 2022/0057874 A1* | 2/2022 | Yamada | H03K 17/962 |
| 2022/0090968 A1* | 3/2022 | Hong | G06F 3/0412 |
| 2022/0187978 A1* | 6/2022 | Kim | G01K 3/005 |
| 2022/0236868 A1* | 7/2022 | Sleeman | G06F 3/047 |
| 2023/0112523 A1* | 4/2023 | Cho | G06F 3/0412 |
| | | | 345/174 |
| 2023/0315239 A1* | 10/2023 | Jeon | G06F 3/0412 |
| | | | 345/174 |
| 2023/0418423 A1* | 12/2023 | Terada | G06F 3/0445 |
| 2024/0053392 A1* | 2/2024 | Seo | G06F 3/0443 |

* cited by examiner

1000

DISPLAY DEVICE, OPERATING METHOD THEREOF, AND ELECTRONIC DEVICE INCLUDING THE SAME

CROSS-REFERENCE TO RELATED APPLICATION

The present application claims priority to and the benefit of Korean patent application No. 10-2024-0022612 filed on Feb. 16, 2024 in the Korean Intellectual Property Office, the entire disclosure of which is incorporated herein by reference.

BACKGROUND

1. Field

Aspects of some embodiments of the present disclosure generally relate to a display device adjusting a threshold for determining a touch, an operating method thereof, and an electronic device including the same.

2. Description of the Related Art

With the development of information technologies, the importance of a display device which provides a connection medium between a user and information has increased. Accordingly, display devices such as liquid crystal display devices and organic light emitting display devices are increasingly used.

A display device may include a display unit for displaying images and a sensor unit for sensing a touch position. The display unit may display images, corresponding to a driving signal supplied from a display driver, and the sensor unit determines a touch, corresponding to a touch signal supplied from a sensor driver. The sensor driver may determine a touch, based on a variation in mutual capacitance corresponding to the touch signal.

The above information disclosed in this Background section is only for enhancement of understanding of the background and therefore the information discussed in this Background section does not necessarily constitute prior art.

SUMMARY

Aspects of some embodiments include a display device that may be capable of adjusting a magnitude of a threshold for determining a touch according to temperature.

According to some embodiments of the present disclosure, there is provided a display device including: a sensor unit including first sensors and second sensors; and a sensor driver configured to control the sensor unit, wherein the sensor driver includes: a change rate calculator configured to calculate a first mutual capacitance of the sensor unit, and calculate a change rate corresponding to the first mutual capacitance; and a threshold calculator configured to generate a threshold by applying the change rate to a reference threshold.

According to some embodiments, the change rate may refer to an increment or decrement of the first mutual capacitance at an external temperature of the display device as compared with a second mutual capacitance at a room temperature.

According to some embodiments, the reference threshold may be a threshold for determining a touch at a room temperature. According to some embodiments, the threshold may be a value for determining the touch at an external temperature of the display device.

According to some embodiments, the sensor driver may further include a temperature measurer. According to some embodiments, the temperature measurer may measure an external temperature of the display device. According to some embodiments, the external temperature may be output to the change rate calculator and the threshold calculator.

According to some embodiments, based on the external temperature being higher than the room temperature, the threshold may be larger than the reference threshold.

According to some embodiments, a degree to which the threshold is large as compared with the reference threshold may be the same as the change rate.

According to some embodiments, based on the external temperature being lower than the room temperature, the threshold may be smaller than the reference threshold.

According to some embodiments, a degree to which the threshold is small as compared with the reference threshold may be the same as the change rate.

According to some embodiments of the present disclosure, there is provided a method of operating a display device including a sensor unit including first sensors and second sensors, the method including: calculating a mutual capacitance corresponding to each of external temperatures and calculating a change rate corresponding to each of the external temperatures during a test period; measuring an external temperature during an operation period after the test period; and calculating a threshold by applying, to a reference threshold, the change rate corresponding to the measured external temperature.

According to some embodiments, the calculating of the mutual capacitance corresponding to each of the external temperatures and the calculating of the change rate corresponding to each of the external temperatures during the test period may include: setting the external temperature as a start temperature; calculating a mutual capacitance of the sensor unit at the external temperature; comparing whether the external temperature is a highest temperature after the mutual capacitance of the sensor unit is calculated; and calculating the change rate corresponding to each of the external temperatures when the external temperature is the highest temperature.

According to some embodiments, the method may further include setting the external temperature as a temperature increasing by a step value when the external temperature is not the highest temperature.

According to some embodiments, the external temperatures may include temperatures increasing by the step value from the start temperature to the highest temperature.

According to some embodiments, the calculating of the mutual capacitance of the sensor unit may include: calculating mutual capacitances between the first sensors and the second sensors; and calculating an average value of the calculated mutual capacitances.

According to some embodiments, the calculating of the change rate corresponding to each of the external temperatures may include calculating an increment or decrement of the mutual capacitance corresponding to each of the external temperatures as compared with a mutual capacitance at a room temperature.

According to some embodiments, the calculating of the change rate corresponding to each of the external temperatures may include storing the calculated change rates in a memory.

According to some embodiments, the reference threshold may be a threshold for determining a touch at a room temperature. According to some embodiments, the threshold may be a value for determining the touch at an external temperature of the display device.

According to some embodiments, based on the measured external temperature being higher than a room temperature, the threshold may be larger than the reference threshold.

According to some embodiments, a degree to which the threshold is large as compared with the reference threshold may be the same as the change rate.

According to some embodiments, based on the measured external temperature being lower than a room temperature, the threshold may be smaller than the reference threshold.

According to some embodiments, a degree to which the threshold is small as compared with the reference threshold may be the same as the change rate.

According to some embodiments of the present disclosure, there is provided an electronic device including a processor to provide input image data, and a display device to display an image based on the input image data, wherein the display device includes a sensor unit including first sensors and second sensors, and a sensor driver configured to control the sensor unit, wherein the sensor driver includes a change rate calculator configured to calculate a first mutual capacitance of the sensor unit, and calculate a change rate corresponding to the first mutual capacitance, and a threshold calculator configured to generate a threshold by applying the change rate to a reference threshold.

BRIEF DESCRIPTION OF THE DRAWINGS

Aspects of some embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
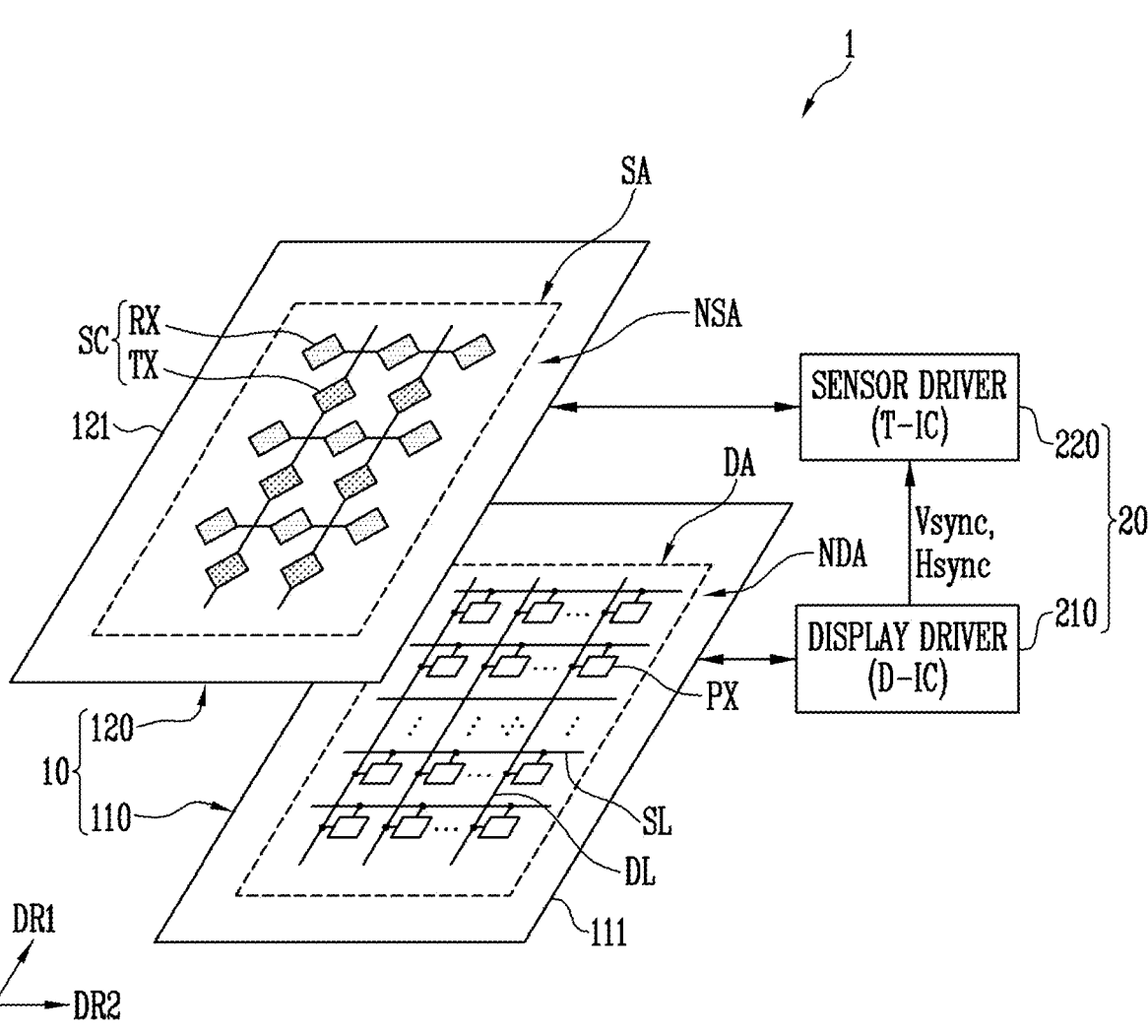
FIG. 1 is a diagram illustrating a display device according to some embodiments of the present disclosure.

Hereinafter, aspects of some embodiments are described in more detail with reference to the accompanying drawings so that those skilled in the art may easily practice the present disclosure. The present disclosure may be implemented in various different forms and is not limited to the embodiments described in the present specification.

Further, parts of the drawing that do not relate to the present disclosure have been omitted to clarify the description of the present disclosure. Like parts are designated with like reference numerals throughout the specification.

In addition, terms including "unit." "module," and the like, which are used herein, refer to units which perform at least one function or operation, and the unit, the module, and the like may be implemented as hardware, software, or a combination of hardware and software. Detailed descriptions of overlapping components will be omitted to clarify the scope of the present disclosure.

FIG. 1 is a diagram illustrating a display device 1 according to some embodiments of the present disclosure.

Referring to FIG. 1, the display device 1 may include a panel 10 and a driving circuit 20 for driving the panel 10. Also, the display device 1 may further include an application processor, or be connected to the application processor.

The panel 10 may include a display unit 110 for displaying images and a sensor unit 120 for sensing a touch, a pressure, a fingerprint, hovering, biometric information (or biometric characteristic), or the like. For example, the panel 10 may include pixels PX and sensors SC located while overlapping with at least some of the pixels PX. According to some embodiments, the sensors SC may include first sensors TX (or driving electrodes) and second sensors RX (or sensing electrodes). According to some embodiments (e.g., a self-capacitance mode), the sensors SC may be configured with one kind of sensors without distinguishing the first sensors TX and the second sensors RX from each other.

The driving circuit 20 may include a display driver (D-IC) 210 for driving the display unit 110 and a sensor driver (T-IC) 220 for driving the sensor unit 120. For example, the pixels PX may display images by using a display frame period as a unit. For example, the sensors SC may sense an input of a user by using a sensing frame period as a unit. The sensing frame period and the display frame period may be independent from each other or be different from each other. The sensing frame period and the display frame period may be synchronized with each other or be unsynchronized.

According to some embodiments, after the display unit 110 and the sensor unit 120 are manufactured separately from each other, the display unit 110 and the sensor unit 120 may be arranged and/or coupled to overlap with each other (e.g., in at least one area). According to some embodiments, the display unit 110 and the sensor unit 120 may be integrally manufactured. For example, the sensor unit 120 may be formed directly on at least one substrate (e.g., an upper substrate and/or a lower substrate of a display panel, or a thin film encapsulation layer) which constitutes the display unit 110, or another insulating layer or one of various types of functional layers (e.g., an optical layer or a protective layer).

Meanwhile, although a case where the sensor unit 120 is located on a front surface (e.g., an upper surface on which an image is displayed) of the display unit 110 is illustrated in FIG. 1, the position of the sensor unit 120 is not limited thereto. According to some embodiments, the sensor unit 120 may be located on a rear surface or both surfaces of the display unit 110. According to some embodiments, the sensor unit 120 may be located in at least one edge area of the display unit 110.

The display unit 110 may include a display substrate 111 and a plurality of pixels PX formed on the display substrate 111. The pixels PX may be located in a display area DA of the display substrate 111.

The display substrate 111 may include the display area DA in which an image is displayed and a non-display area NDA at the periphery (or outside a footprint) of the display area DA. According to some embodiments, the display area DA may be located in a central area of the display unit 110, and the non-display area NDA is located in an edge area of the display unit 110 to surround the display area DA.

The display substrate 111 may be a rigid substrate or a flexible substrate, and the material or property of the display substrate 111 is not particularly limited. For example, the display substrate 111 may be a rigid substrate made of glass (e.g., tempered glass), or a flexible substrate configured with a thin film made of plastic or metal.

Scan lines SL and data lines DL, and the pixels PX connected to the scan lines SL and the data lines DL are located in the display area DA. Pixels PX are selected by a scan signal having a turn-on level, which is supplied from the scan lines SL, to be supplied with a data signal from the data lines DL, and emit light with a luminance corresponding to the data signal. Accordingly, an image corresponding to the data signal is displayed in the display area DA. In the present disclosure, the structure, driving method, and the like of the pixels PX are not particularly limited. For example, each of the pixels PX may be implemented as a pixel having various structures and/or various driving methods, which are currently known in the art.

Various types of lines and/or a built-in circuit, connected to the pixels PX of the display area DA, may be located in the non-display area NDA. In an example, a plurality of lines for supplying various power sources and various control signals to the display area DA may be located in the non-display area NDA. In addition, a scan driver and the like may be further located in the non-display area NDA.

In the present disclosure, the kind of the display unit 110 is not particularly limited. For example, the display unit 110 may be implemented as a self-luminous display panel such as an organic light emitting display panel. However, when the display unit 110 is implemented as a self-luminescent display panel, each of the pixels PX is not necessarily limited to a case where the pixel PX includes only an organic light emitting element. For example, the light emitting element of each of the pixels PX may be configured as an organic light emitting diode, an inorganic light emitting diode, a quantum dot/well light emitting diode, or the like. A plurality of light emitting elements may be provided in each of the pixels PX. The plurality of light emitting elements may be connected in series, parallel, series/parallel, or the like. Alternatively, the display unit 110 may be implemented as a non-light emitting display panel such as a liquid crystal display panel. When the display unit 110 is implemented as a non-light emitting display panel, the display device 1 may additionally include a light source such as a back-light unit.

The sensor unit 120 may include a sensor substrate 121 and a plurality of sensors SC formed on the sensor substrate 121. The sensors SC may be located in a sensing area SA on the sensor substrate 121.

The sensor substrate 121 may include the sensing area SA capable of sensing a touch input or the like and a peripheral area NSA at the periphery of the sensing area SA. According to some embodiments, the sensing area SA may be arranged to overlap with at least one area of the display area DA. According to some embodiments, the sensing area SA may be set as an area corresponding to the display area DA (e.g., an area overlapping with the display area DA), and the peripheral area NSA may be set as an area corresponding to the non-display area NDA (e.g., an area overlapping with the non-display area NDA). When a touch input or the like is provided on the display area DA, the touch input may be detected through the sensor unit 120.

The sensor substrate 121 may be a rigid or flexible substrate. In addition, the sensor substrate 121 may be configured with at least one insulating layer. Also, the sensor substrate 121 may be a transparent or translucent light transmission substrate, but embodiments according to the present disclosure are not limited thereto. That is, in the present disclosure, the material and property of the sensor substrate 121 are not particularly limited. For example, the sensor substrate 121 may be a rigid substrate configured with glass (e.g., tempered glass), or a flexible substrate configured with a thin film made of plastic or metal. According to some embodiments, at least one substrate (e.g., the display substrate 111, an encapsulation substrate, and/or a thin film encapsulation layer) which constitutes the display unit 110, or at least one insulating layer, at least one functional layer, or the like, which is located at the inside and/or an outer surface of the display unit 110, may be used as the sensor substrate 121.

The sensing area SA is set as an area capable of reacting to a touch input (i.e., an active area of the sensor unit 120). To this end, the sensors SC for sensing a touch input or the like may be located in the sensing area SA. According to some embodiments, the sensors SC may include the first sensors TX and the second sensors RX.

When the display unit 110 and the sensor unit 120 are located adjacent to each other, a parasitic capacitance may be formed between the display unit 110 and the sensor unit 120. According to some embodiments, the first sensors TX and the second sensors RX of the sensor unit 120 may overlap with a cathode electrode, a common electrode, or the like, which is configured inside the display unit 110, while being adjacent to the cathode electrode, the common electrode, or the like. Accordingly, a relatively large parasitic capacitance may be formed between the display unit 110 and the sensor unit 120, and noise caused by a driving signal or the like, applied to the display unit 110, may be transferred to the sensor unit 120 due to a coupling effect.

For example, each of the first sensors TX may extend in a first direction DR1. The first sensors TX may be arranged in a second direction DR2. The second direction DR2 may be different from the first direction DR1. For example, the second direction DR2 may be a direction intersecting the first direction DR1. According to some embodiments, the extending direction and arrangement direction of the first sensors TX may follow a conventional configuration. Each of the first sensors TX may have a form in which first cells having a relatively wide area and first bridges having a relatively narrow area are connected to each other. Although a case where each of the first cells has a diamond shape is illustrated in FIG. 1, each of the first cells may be configured in various conventional shapes including a circular shape, a triangular shape, a mesh shape, another polygonal shape, and the like. For example, the first bridges may be integrally formed with the first cells on the same layer. According to some embodiments, the first bridges may be formed in a layer different from a layer of the first cells, to electrically connect adjacent first cells to each other.

For example, each of the second sensors RX may extend in the second direction DR2. The second sensors RX may be arranged in the first direction DR1. According to some embodiments, the extending direction and arrangement direction of the second sensors RX may follow another conventional configuration. Each of the second sensors RX may have a form in which second cells having a relatively wide area and second bridges having a relatively narrow area are connected to each other. Although a case where each of the second cells has a diamond shape is illustrated in FIG. 1, each of the second cells may be configured in various conventional shapes including a circular shape, a triangular shape, a mesh shape, another polygonal shape, and the like. For example, the second bridges may be integrally formed with the second cells on the same layer. According to some embodiments, the second bridges may be formed in a layer different from a layer of the second cells, to electrically connect adjacent second cells to each other.

According to some embodiments, each of the first sensors TX and the second sensors RX may include at least one of a metal material, a transparent conductive material, and various other conductive materials, thereby having conductivity. In an example, the first sensors TX and the second sensors RX may include at least one of various metal materials including gold (Au), silver (Ag), aluminum (Al), molybdenum (Mo), chromium (Cr), titanium (Ti), nickel (Ni), neodymium (Nd), copper (Cu), platinum (Pt), and/or the like, or alloys thereof. The first sensors TX and the second sensors RX may be configured in a mesh shape. Also, the first sensors TX and the second sensors RX may include at least one of various transparent conductive materials including silver nano wire (AgNW), Indium Tin Oxide (ITO), Indium Zinc Oxide (IZO), Indium Gallium Zinc Oxide (IGZO), Antimony Zinc Oxide (AZO), Indium Tin Zinc Oxide (ITZO), Zinc Oxide (ZnO), Tin Oxide ($SnO_2$), carbon nano tube, graphene, and/or the like. In addition, the first sensors TX and the second sensors RX may include at least one of various other conductive materials, thereby having conductivity. Also, each of the first sensors TX and the second sensors RX may be configured as a single layer or a multi-layer, and a sectional structure thereof is not particularly limited.

Meanwhile, sensor lines for electrically connecting the first and second sensors TX and RX to the sensor driver 220, and the like may be concentrically located in the peripheral area NSA.

The driving circuit 20 may include the display driver 210 for driving the display unit 110 and the sensor driver 220 for driving the sensor unit 120. According to some embodiments, the display driver 210 and the sensor driver 220 may be configured as Integrated Chips (ICs) separated from each other. According to some embodiments, at least a portion of the display driver 210 and at least a portion of the sensor driver 220 may be integrated together in one IC.

The display driver 210 is electrically connected to the display unit 110 to drive the pixels PX. For example, the display driver 210 may include a data driver and a timing controller, and a scan driver may be separately mounted in the non-display area NDA of the display unit 110. According to some embodiments, the display driver 210 may include all or at least some of the data driver, the timing controller, and the scan driver.

The display driver 210 may be supplied with image data and control signals from an application processor. A first oscillator for generating a first clock signal may be provided inside the display driver 210. The display driver 210 may determine a driving frequency (or frame rate), using synchronization signals included in the control signals, and generate various signals including a vertical synchronization signal Vsync and a horizontal synchronization signal Hsync by dividing the first clock signal.

According to some embodiments, an external vertical synchronization signal, an external horizontal synchronization signal, and the like may be included in the control signals supplied to the display driver 210 from the application processor. The display driver 210 may generate the vertical synchronization signal Vsync and the horizontal synchronization signal Hsync, which are to be used inside the display device 1, using the external vertical synchronization signal and the external horizontal synchronization signal.

Figure 2:
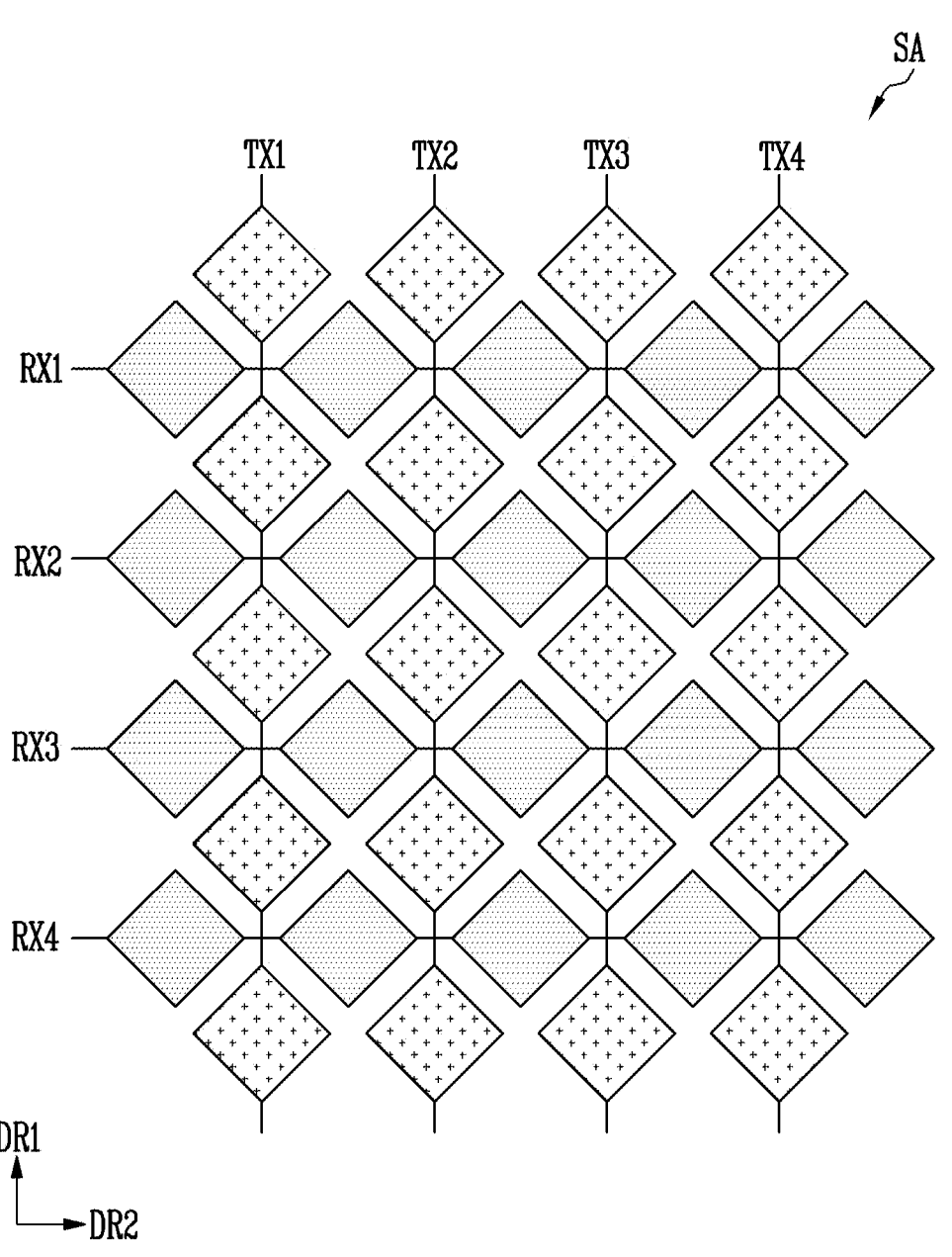
FIG. 2 is a diagram illustrating aspects of sensors included in the display device shown in FIG. 1 according to some embodiments of the present disclosure.

FIG. 2 is a diagram illustrating aspects of the sensors TX and RX included in the display device 1 shown in FIG. 1 according to some embodiments.

Referring to FIGS. 1 and 2, first sensors TX1, TX2, TX3, and TX4 and second sensors RX1, RX2, RX3, and RX4, which are located in the sensing area SA, are illustrated, but embodiments according to the present disclosure are not limited thereto. For convenience of description, it is assumed that four first sensors TX1 to TX4 are located in the sensing area SA and four second sensors RX1 to RX4 are located in the sensing area SA. Actually, y (e.g., y is a natural number greater than 0) to p (e.g., p is a natural number greater than y) first sensors TX and y to p second sensors RX may be located.

Descriptions of the first sensors TX1 to TX4 and the second sensors RX1 to RX4 are identical to the descriptions of the first sensors TX and the second sensors RX, which are shown in FIG. 1, and therefore, overlapping descriptions will be omitted.

Figure 3:
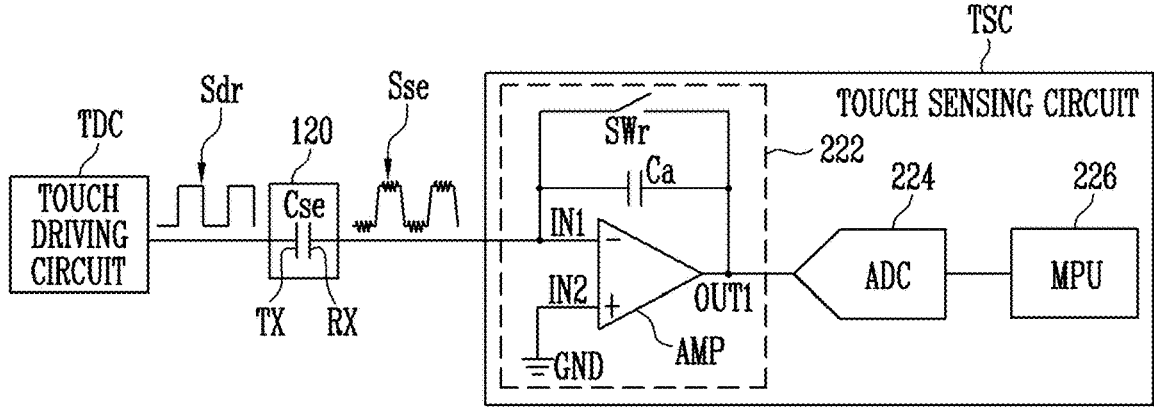
FIG. 3 is a diagram illustrating an operation of a sensor driver according to some embodiments of the present disclosure.

FIG. 3 is a diagram illustrating an operation of the sensor driver 220.

Referring to FIGS. 1 to 3, the sensor unit 120 and the sensor driver 220 may sense an external touch.

The sensor driver 220 may include a sensor receiver TSC (or be referred to as a touch driving circuit) and a sensor transmitter TDC (or be referred to as a touch sensing circuit). The sensor transmitter TDC may be connected to the first sensors TX, and the sensor receiver TSC may be connected to the second sensors RX.

The sensor receiver TSC may include an operational amplifier AMP, an analog-digital converter 224, and a processor 226. In an example, each sensing channel 222 may be implemented as an analog front end (AFE) including at least one operational amplifier AMP. The analog-digital converter 224 and the processor 226 may be provided for each sensing channel 222, and be shared by a plurality of sensing channels 222.

A first input terminal IN1 of the operational amplifier AMP may be connected to corresponding second sensors RX, and a second input terminal IN2 of the operational amplifier AMP may be connected to a ground GND. For example, the first input terminal IN1 may be an inverting terminal, and the second input terminal IN2 may be a non-inverting terminal. According to some embodiments, the second input terminal IN2 may be connected to a signal line supplied with a voltage of a specific magnitude.

The analog-digital converter 224 may be connected to an output terminal OUT1 of the operational amplifier AMP. The analog-digital converter 224 may convert an output of the operational amplifier AMP into a sensing value in a digital form and then output the sensing value. A capacitor Ca and a switch SWr may be connected in parallel between the first input terminal IN1 and the output terminal OUT1.

By a mutual capacitance Cse which each of the first sensors TX1 to TX4 forms with second sensors RX1 to RX4 at the periphery thereof, a sensing signal Sse corresponding to the driving signal Sdr applied to the first sensors TX1 to TX4 may be output through the second sensors RX1 to RX4. The sensing signal Sse may be input to the sensor receiver TSC to be used for detection of a touch input.

According to some embodiments, when the sensor unit 120 includes a plurality of second sensors RX as shown in FIG. 1, the sensor receiver TSC may include a plurality of sensing channels (or receiving channels) 222 electrically connected to each of the second sensors RX. The sensor receiver TSC may receive a sensing signal Sse from each of the second sensors RX through the sensing channel 222, and detect a touch input by synthesizing the received sensing signals Sse.

Figure 4:
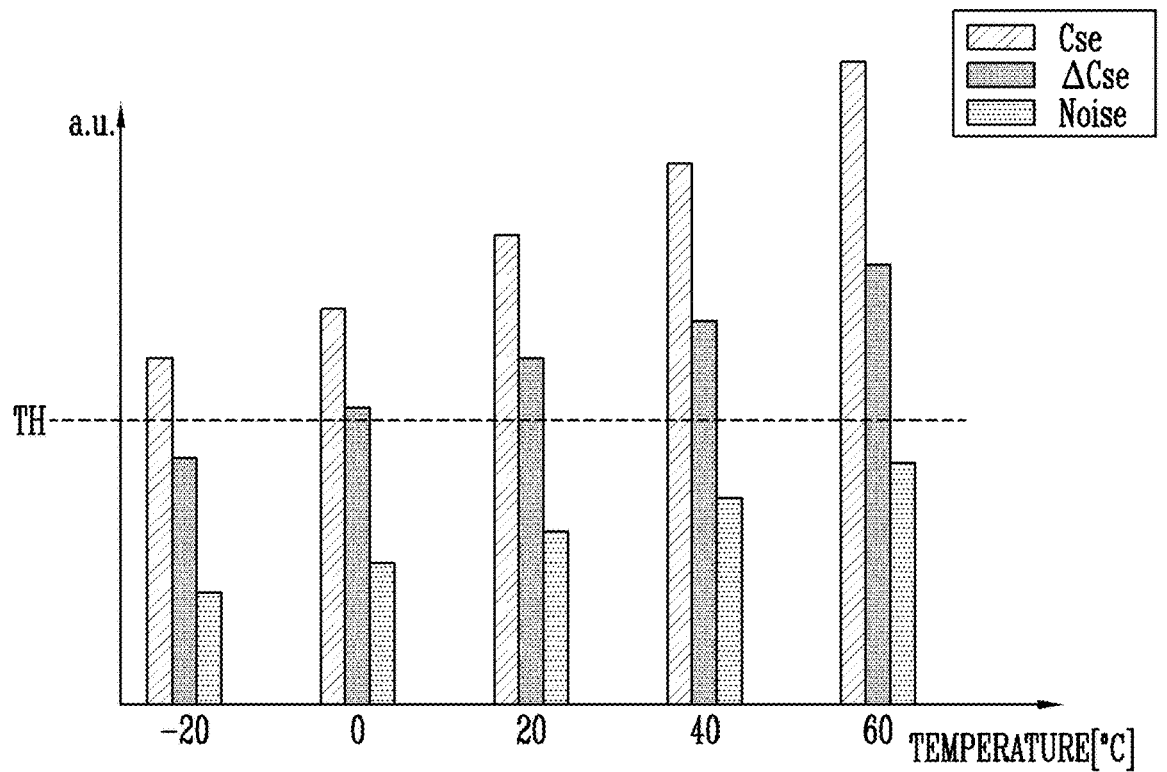
FIGS. 4 and 5 are diagrams illustrating mutual capacitance according to an external temperature of the display device according to some embodiments of the present disclosure.
Figure 5:
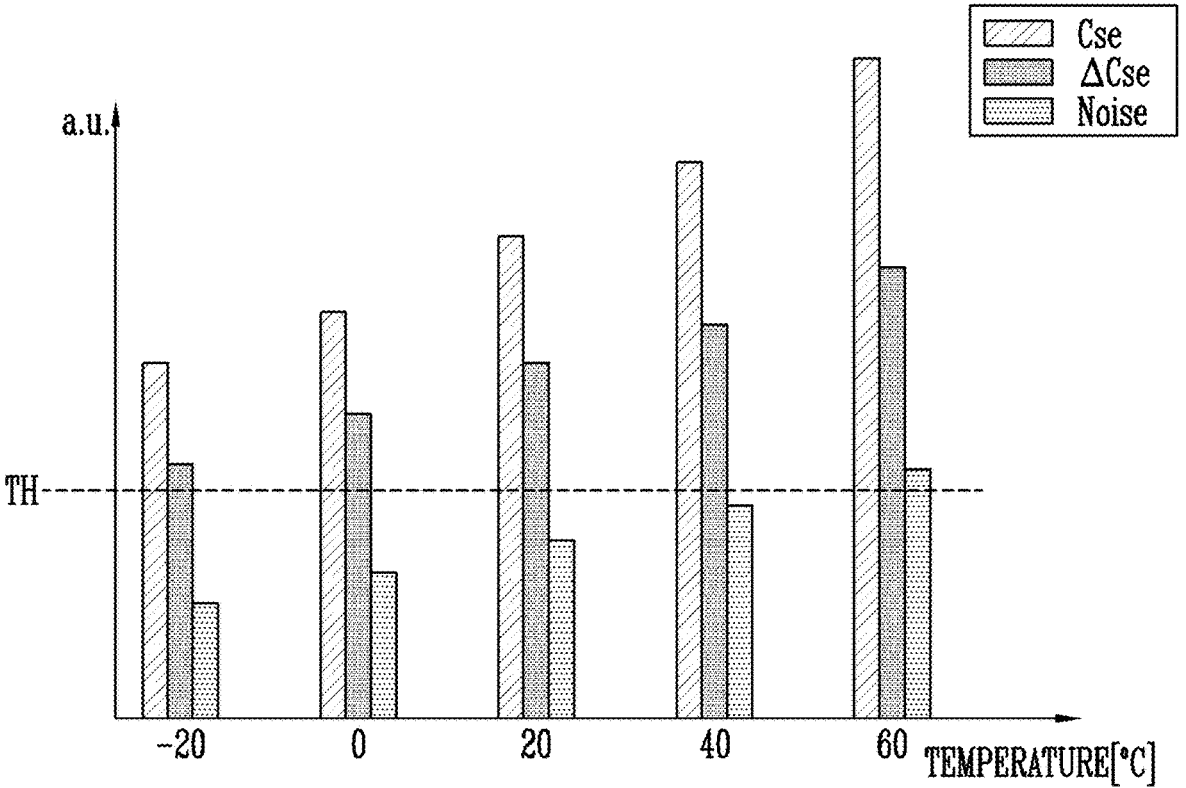

FIGS. 4 and 5 are diagrams illustrating mutual capacitance Cse according to an external temperature of the display device 1.

Referring to FIGS. 1 to 5, mutual capacitance Cse, variation ΔCse in mutual capacitance, and noise according to external temperature of the display device 1 (see FIG. 1) are illustrated. The unit of the horizontal axis is '° C.,' and the unit of the vertical axis is a relative value as an arbitrary unit.

As the external temperature of the display device 1 becomes higher than a room temperature (e.g., 20° C.), the mutual capacitance Cse may increase. Accordingly, the variation ΔCse in mutual capacitance and the noise may also increase. The variation ΔCse in mutual capacitance may be a degree to which the mutual capacitance Cse associated with a touch is changed when the touch occurs in the display device 1.

As the external temperature of the display device 1 becomes lower than the room temperature (e.g., 20° C.), the mutual capacitance Cse may decrease. Accordingly, the variation ΔCse in mutual capacitance and the noise may also decrease.

When the variation ΔCse in mutual capacitance is a threshold TH or more, the sensor receiver TSC may determine that a touch has occurred. The threshold TH may be a value for determining a touch.

Referring to a case where the external temperature of the display device 1 is '−20° C.' lower than the room temperature, which is shown in FIG. 4, the variation ΔCse in mutual capacitance may be less than the threshold TH as the variation ΔCse in mutual capacitance decreases as compared with the room temperature. That is, although a touch occurs in the display device 1, the sensor receiver TSC may determine that any touch has not occurred.

Referring to a case where the external temperature of the display device 1 is '60° C.' higher than the room temperature, which is shown in FIG. 5, the noise may be the threshold TH or more as the noise increases as compared with the room temperature. That is, although any touch does not occur in the display device 1, the sensor receiver TSC may determine that a touch has occurred.

That is, it may be desirable to prevent or reduce noise misrecognition or touch non-recognition of the display device 1 by changing the threshold TH as the external temperature of the display device 1 is changed.

Figure 6:
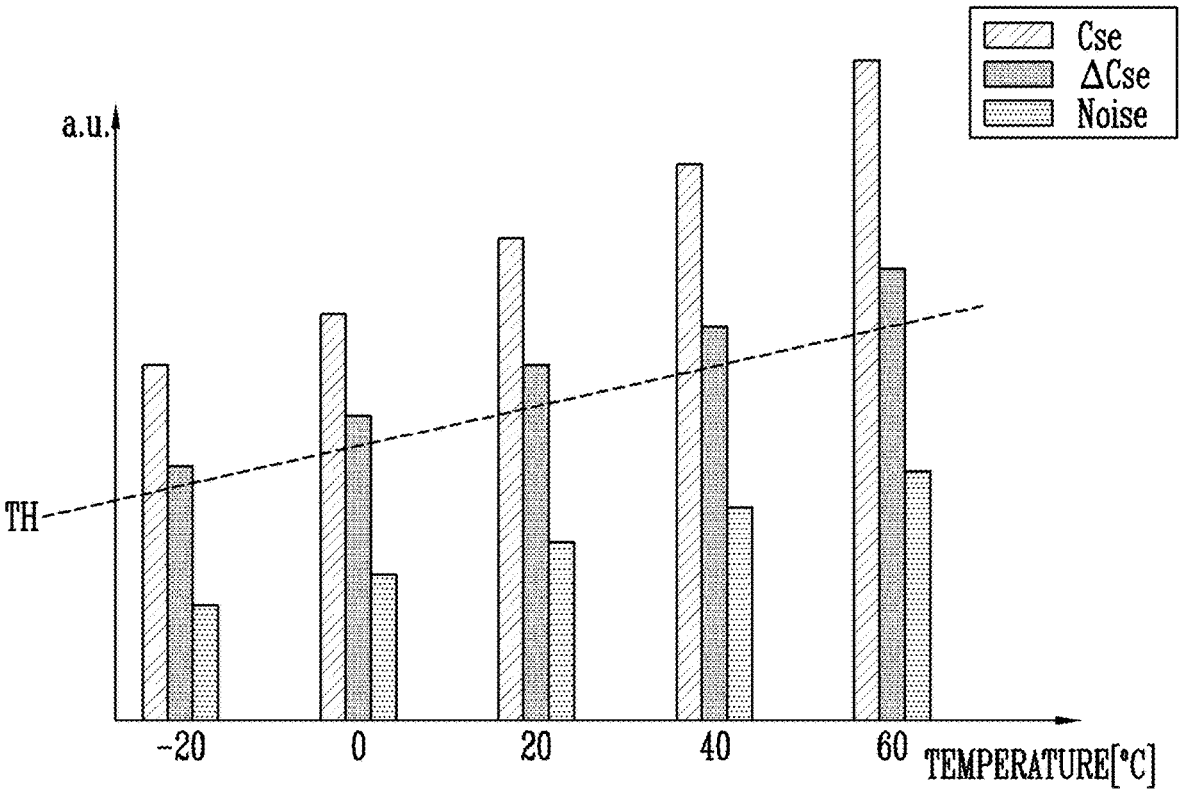
FIG. 6 is a diagram illustrating mutual capacitance according to an external temperature of the display device according to some embodiments of the present disclosure.

FIG. 6 is a diagram illustrating mutual capacitance Cse according to an external temperature of the display device 1 according to some embodiments of the present disclosure.

Referring to FIG. 6, mutual capacitance Cse, variation ΔCse in mutual capacitance, and noise according to external temperature of the display device 1 (see FIG. 1) are illustrated. The unit of the horizontal axis is '° C.,' and the unit of the vertical axis is a relative value as an arbitrary unit.

As the external temperature of the display device 1 becomes higher than a room temperature (e.g., 20° C.), the threshold TH may increase. As the external temperature of the display device 1 becomes lower than the room temperature (e.g., 20° C.), the threshold TH may decrease.

Referring to a case where the external temperature of the display device 1 is '−20° C.' lower than the room temperature, the variation ΔCse in mutual capacitance may decrease as compared with the room temperature, as the mutual capacitance Cse decreases as compared with the room temperature. Accordingly, the threshold TH may decrease as compared with the room temperature. The sensor receiver TSC (see FIG. 3) may sense a touch of the display device 1 even when the external temperature of the display device 1 is lower than the room temperature.

Referring to a case where the external temperature of the display device 1 is '60° C.' higher than the room temperature, the noise may increase as compared with the room temperature, as the mutual capacitance Cse increases as compared with the room temperature. Accordingly, the threshold TH may increase as compared with the room temperature. The sensor receiver TSC (see FIG. 3) may not recognize noise of the display device 1 as a touch even when the external temperature of the display device 1 is higher than the room temperature.

Accordingly, the noise misrecognition or touch non-recognition of the display device 1 can be prevented or reduced, and the accuracy of touch sensing can be improved.

Figure 7:
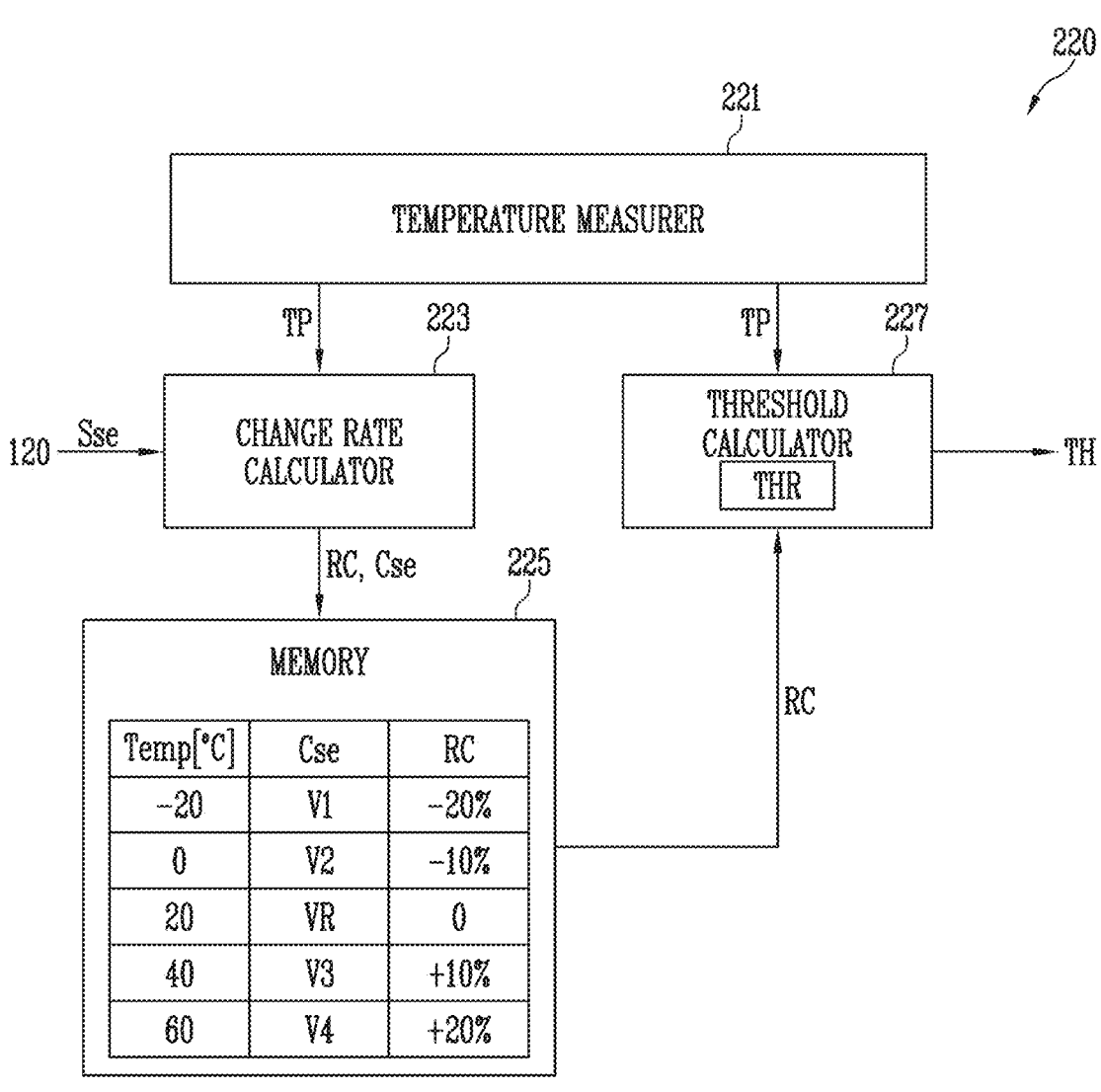
FIG. 7 is a block diagram illustrating a sensor driver according to some embodiments of the present disclosure.

FIG. 7 is a block diagram illustrating a sensor driver 220 according to some embodiments of the present disclosure.

Referring to FIGS. 1 and 7, the sensor driver 220 may include a temperature measurer 221, a change rate calculator 223, a memory 225, and a threshold calculator 227.

The temperature measurer 221 may measure an external temperature TP of the display device 1 (see FIG. 1). The temperature measurer 221 may output the external temperature TP to the change rate calculator 223 and the threshold calculator 227.

In the present disclosure, it is illustrated that the temperature measurer 221 is included in the sensor driver 220. However, the present disclosure is not limited thereto, and the temperature measurer 221 may be included in a component except the sensor driver 220.

The change rate calculator 223 may calculate a change rate RC for each external temperature TP, based on the external temperature TP and a sensing signal Sse. The change rate RC may refer to an increment or decrement of a mutual capacitance Cse at the external temperature as compare with a mutual capacitance VR at the room temperature.

The change rate calculator 223 may calculate a mutual capacitance Cse of the sensor unit 120, based on the sensing signal Sse. For example, when the external temperature TP is '0° C.,' the change rate calculator 223 may calculate the mutual capacitance Cse of the sensor unit 120, based on the sensing signal Sse received from the sensor unit 120.

The change rate calculator 223 may calculate a change rate RC of a mutual capacitance Cse as compared with a mutual capacitance VR at the room temperature.

According to some embodiments, the calculated mutual capacitance Cse may be an average of mutual capacitances Cse between the first sensors TX and the second sensors RX of the sensor unit 120. The change rate calculator 223 may calculate a change rate RC corresponding to the external temperature TP by comparing an average value of mutual capacitances Cse at the external temperature TP with an average value of mutual capacitances VR at the room temperature.

The change rate calculator 223 may output a mutual capacitance Cse and a change rate RC for each external temperature TP to the memory 225. According to some embodiments, the change rate calculator 223 may calculate the change rate RC for each external temperature TP, based on the mutual capacitance Cse for each external temperature TP, which is stored in the memory 225.

The memory 225 may store the mutual capacitance Cse and the change rate RC for each external temperature TP. However, the present disclosure is not limited thereto. The memory 225 may store only the change rate RC. The memory 225 may be included in a component of the display device 1 except the sensor driver 220.

The threshold calculator 227 may generate a threshold TH, based on the external temperature TP received from the temperature measurer 221 and the change rate RC stored in the memory 225.

For example, when the external temperature TP is '−20° C.,' a change rate RC corresponding to '−20° C.' is '−20%,' and therefore, the threshold calculator 227 may generate a threshold TH by applying the change rate RC to a reference threshold THR. The reference threshold THR may be a threshold for determining a touch at the room temperature.

In the present disclosure, it is illustrated that the reference threshold THR is stored in the threshold calculator 227. However, the present disclosure is not limited thereto, and the reference threshold THR may be stored in the memory 225 or be input from the outside.

Hereinafter, an operating method of the sensor driver 220 will be illustrated.

During a test period, the sensor driver 220 may calculate a mutual capacitance Cse corresponding to each of external temperatures TP, and calculate a change rate RC corresponding to each of the external temperatures TP. The test period may be a period for setting parameters of the display device 1 before the display device 1 is actually used.

According to some embodiments, the external temperatures TP may include temperatures increasing by a step value from a start temperature to a highest temperature. For example, the external temperature TP of the display device 1 may increase by the step value of '20° C.' from '−20° C.' to '60° C.' Accordingly, the external temperature TP may be sequentially set as '−20° C.,' '0° C.,' '20° C.,' '40° C.,' and '60° C.' The step value may be freely set according to settings of a user.

The temperature measurer 221 may measure external temperatures TP set during the test period, and output the measured external temperatures TP to the change rate calculator 223.

The change rate calculator 223 may change a change rate RC corresponding to each of the external temperatures TP, based on a mutual capacitance Cse corresponding to each of the external temperatures TP and a mutual capacitance VR at the room temperature.

For example, The change rate calculator 223 may change a change rate RC corresponding '−20° C.', based on a mutual capacitance V1 at '−20° C.' and a mutual capacitance VR at the room temperature. Also, The change rate calculator 223 may change a change rate RC corresponding '60° C.', based on a mutual capacitance V4 at '60° C.' and a mutual capacitance VR at the room temperature.

For example, when the external temperature TP of the display device 1 is '0° C.,' the change rate calculator 223 may calculate a mutual capacitance V2 at '0° C.' The change rate calculator 223 may calculate a change rate RC of a mutual capacitance V2 at '0° C.' as compared with the mutual capacitance VR at the room temperature. When the mutual capacitance V2 at '0° C.' decreased by 10% as compared with the mutual capacitance VR at the room temperature, the change rate RC at '0° C.' may be '−10%.'

According to some embodiments, when the external temperature TP of the display device 1 is '40° C.,' the change rate calculator 223 may calculate a mutual capacitance V3 at '40° C.' The change rate calculator 223 may calculate a change rate RC of a mutual capacitance V3 at '40° C.' as compared with the mutual capacitance VR at the room temperature. When the mutual capacitance V3 at '40° C.' increases by 10% as compared with the mutual capacitance VR at the room temperature, the change rate RC at '40° C.' may be '+10%.'

During an operation period after the test period, the sensor driver 220 may calculate a threshold TH, based on the reference threshold THR and a change rate RC corresponding to the external temperature TP during the operation period. The operation period may be a period in which images are displayed when the display device 1 is actually used.

During the operation period, the temperature measurer 221 may measure an external temperature TP and output the measured external temperature TP to the threshold calculator 227. The threshold calculator 227 may generate a threshold TH, based on the external temperature TP received from the temperature measurer 221 and a change rate RC corresponding to each of the external temperatures TP stored in the memory 225.

For example, when the external temperature TP of the display device 1, which is measured during the operation period, is '0° C.,' the threshold calculator 227 may calculate a threshold TH by applying '−10%' to the reference threshold THR, based on that the change rate RC of '0° C.' is '−10%.' Accordingly, as the external temperature TP of the display device 1 is lower than the room temperature, the threshold TH may be smaller than the reference threshold THR at the room temperature. That is, a degree to which the threshold TH is small as compared with the reference threshold THR may be the same as the change rate RC.

In another example, when the external temperature TP of the display device 1, which is measured during the operation period, is '40° C.,' the threshold calculator 227 may calculate a threshold TH by applying '+10%' to the reference threshold THR, based on that the change rate RC of '40° C.' is '+10%.' Accordingly, as the external temperature TP of the display device 1 is higher than the room temperature, the threshold TH may be larger than the reference threshold THR at the room temperature. That is, a degree to which the threshold TH is large as compared with the reference threshold THR may be the same as the change rate RC.

Figure 8:
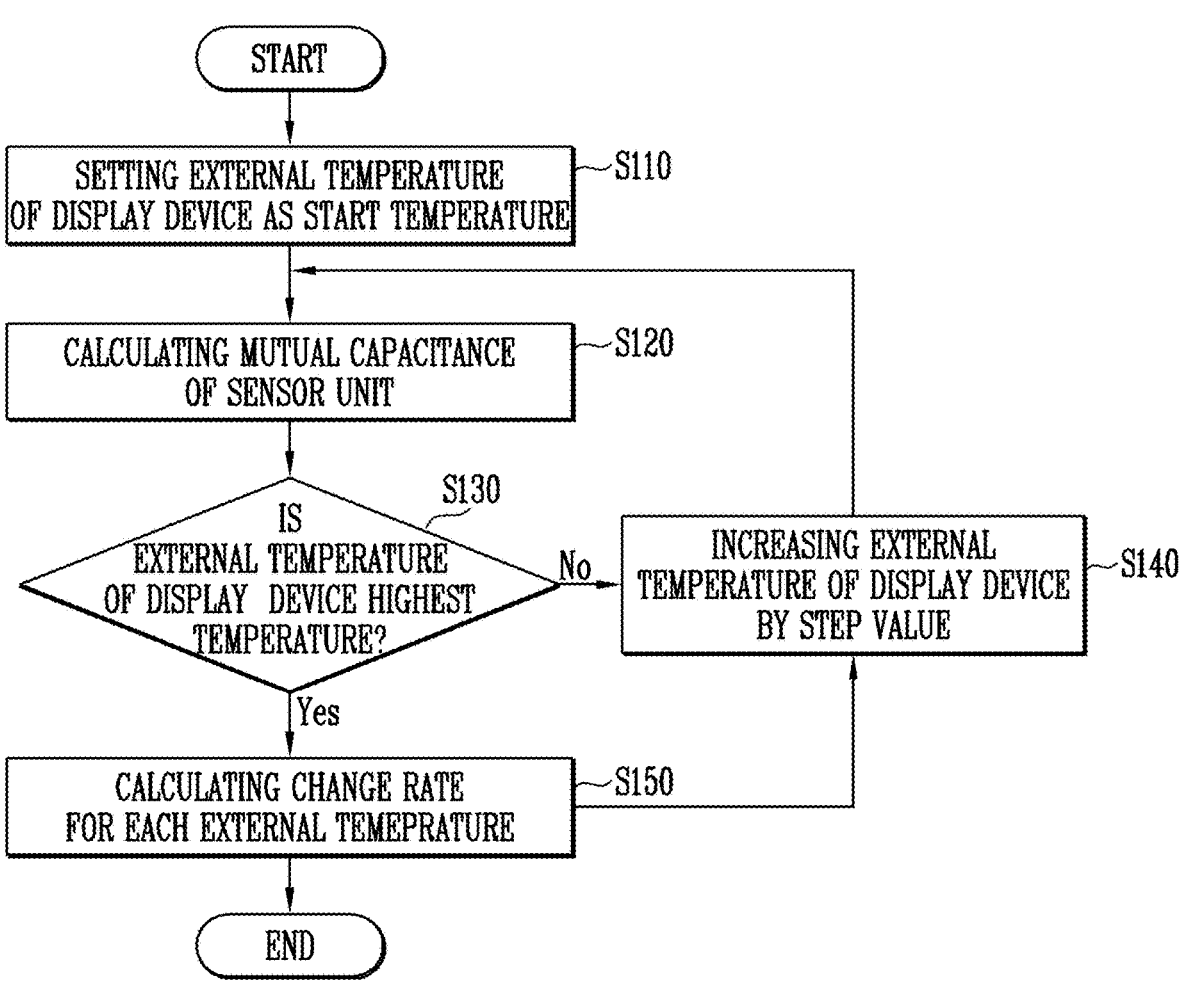
FIG. 8 is a flowchart illustrating aspects of an operating method of the display device during a test period according to some embodiments of the present disclosure.

FIG. 8 is a flowchart illustrating an operating method of the display device 1 during a test period. Although FIG. 8 illustrates aspects of various operations in the operating method of the display device 1 during a test period, embodiments according to the present disclosure are not limited thereto. For example, according to some embodiments, the method may include additional operations, or fewer operations, or the order of operations may vary, unless otherwise stated or implied, without departing from the spirit and scope of embodiments according to the present disclosure.

Referring to FIG. 8, an operation of the display device 1 shown in FIG. 1 during a test period is illustrated. The display device 1 may include the sensor driver 220 shown in FIG. 7.

In operation S110, an external temperature TP of the display device 1 may be set as a start temperature. For example, the start temperature may be '−20° C.'

In operation S120, the display device 1 may calculate a mutual capacitance of the sensor unit 120. According to some embodiments, the mutual capacitance of the sensor unit 120 may be an average value of mutual capacitances of the first sensors TX and the second sensors RX.

In operation S130, when the external temperature TP of the display device 1 is not a highest temperature, operation S140 may be performed. When the external temperature TP of the display device 1 is the highest temperature, operation S150 may be performed.

In the operation S140, the external temperature TP of the display device 1 may increase by a step value. For example, the step value may be '20° C.'

In the operation S150, a change rate RC corresponding to each of external temperatures TP of the display device 1 may be calculated. The external temperatures TP may include temperatures increasing by the step value from the start temperature to the highest temperature. According to some embodiments, the operation of calculating the change rate RC corresponding to each of the external temperatures TP may include an operation of calculating an increment or decrement of a mutual capacitance Cse corresponding to each of the external temperatures TP as compared with a mutual capacitance VR at a room temperature. According to some embodiments, the operation of calculating the change rate RC corresponding to each of the external temperatures TP may include an operation of storing the calculated change rates RC in the memory 225.

Figure 9:
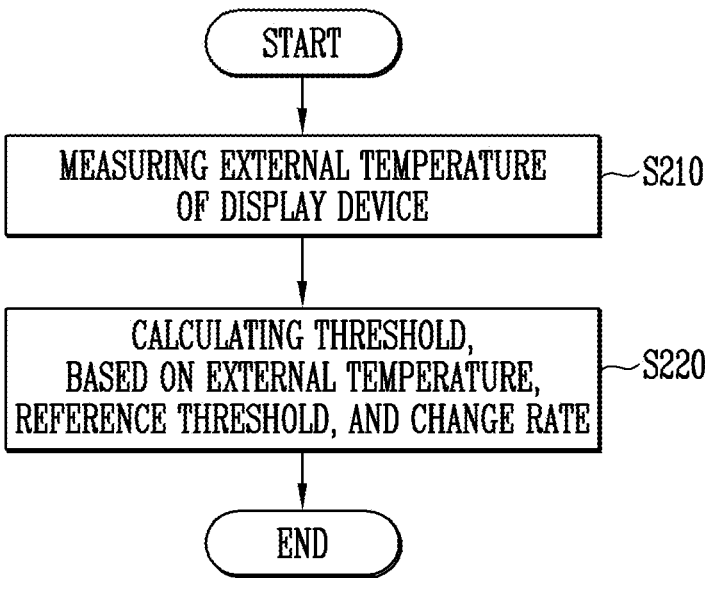
FIG. 9 is a flowchart illustrating aspects of an operating method of the display device during an operation period.

FIG. 9 is a flowchart illustrating an operating method of the display device 1 during an operation period. Although FIG. 9 illustrates aspects of various operations in the operating method of the display device 1 during an operation period, embodiments according to the present disclosure are not limited thereto. For example, according to some embodiments, the method may include additional operations, or fewer operations, or the order of operations may vary, unless otherwise stated or implied, without departing from the spirit and scope of embodiments according to the present disclosure.

Referring to FIG. 9, an operation of the display device 1 shown in FIG. 1 during an operation period after the test period is illustrated. The display device 1 may include the sensor driver 220 shown in FIG. 7.

In operation S210, the display device 1 may measure an external temperature TP.

In operation S220, the display device 1 may calculate a threshold TH, based on the measured external temperature TP, a reference threshold THR, and a change rate RC.

In the display device according to some embodiments of the present disclosure, the display device may adjust a threshold for determining a touch according to temperature, so that touch misrecognition or noise non-recognition can be prevented or reduced.

Figure 10:
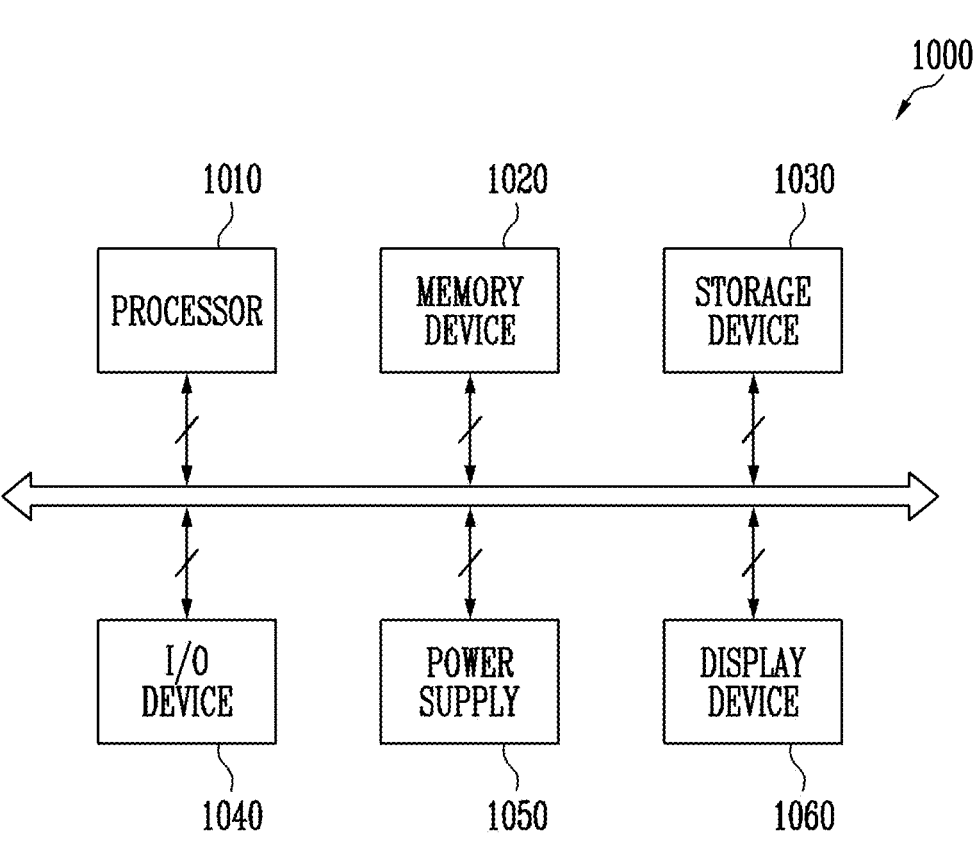
FIG. 10 is a block diagram illustrating an electronic device in accordance with embodiments of the present disclosure.
Figure 11:
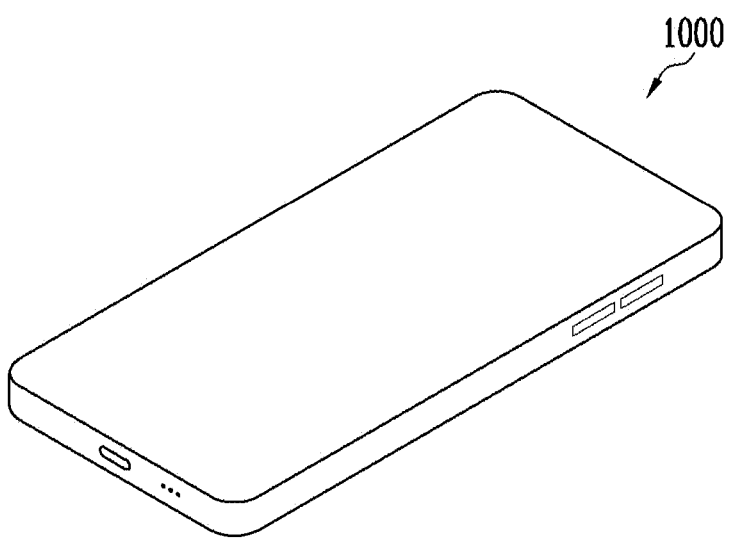
FIG. 11 is a schematic diagram illustrating an example where the electronic device of FIG. 10 is implemented as a smartphone.
Figure 12:
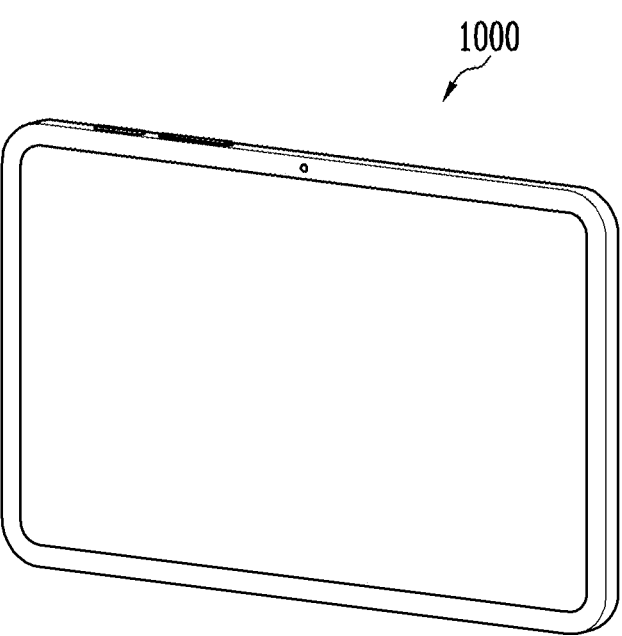
FIG. 12 is a schematic diagram illustrating an example where the electronic device of FIG. 10 is a tablet computer.

FIG. 10 is a block diagram illustrating an electronic device 1000 in accordance with embodiments of the present disclosure. FIG. 11 is a diagram illustrating an example where the electronic device 1000 of FIG. 10 is a smartphone. FIG. 12 is a schematic diagram illustrating an example where the electronic device 1000 of FIG. 10 is a tablet computer.

Referring to FIGS. 10 to 12, the electronic device 1000 may include a processor 1010, a memory device 1020, a storage device 1030, an input/output (I/O) device 1040, a power supply 1050, and a display device 1060. The display device 1060 may be the display device 1 of FIG. 1. The electronic device 1000 may further include various ports for communication with a video card, a sound card, a memory card, a USB device, or other systems. In an embodiment, as illustrated in FIG. 11, the electronic device 1000 may be implemented as a smartphone. In an embodiment, as illustrated in FIG. 12, the electronic device 1000 may be implemented as a tablet computer. However, the aforementioned examples are illustrative, and the electronic device 1000 is not limited to the aforementioned examples. For example, the electronic device 1000 may be implemented as a cellular phone, a video phone, a smart pad, a smartwatch, a navigation device for vehicles, a computer monitor, a laptop computer, a head-mounted display device, and so on.

The processor 1010 may perform specific calculations or tasks. In an embodiment, the processor 1010 may include at least one of a central processing unit, an application processor, a graphic processing unit, a communication processor, an image signal processor, a controller, and the like. The processor 1010 may be connected to other components through an address bus, a control bus, a data bus, and the like. In an embodiment, the processor 1010 may be connected to an expansion bus such as a peripheral component interconnect (PCI) bus. In an embodiment, the processor 1010 may provide input image data to the display device 1060. Hence, the display device 1060 may display an image based on the input image data provided from the processor 1010.

The memory device 1020 may store data needed to perform the operation of the electronic device 1000. The memory device 1020 may function as a working memory and/or a buffer memory for the processor 1010. For example, the memory device 1020 may include one or more volatile memory devices such as a dynamic random access memory (DRAM) device, a static random access memory (SRAM) device, and a mobile DRAM device.

The storage device 1030 may store data in response to control signals or data from the processor 1010. The storage device 1030 may include one or more non-volatile storages to retain the data even when the electronic device 1000 is powered off. In some embodiments, the storage device 1030 may include a solid state drive (SSD), a hard disk drive (HDD), a CD-ROM, or the like.

The I/O device 1040 may include input devices such as a keyboard, a keypad, a touchpad, a touch screen, and a mouse, and output devices such as a speaker and a printer. In an embodiment, the display device 1060 may be integrated with the I/O device 1040.

The power supply 1050 may supply power needed to perform the operation of the electronic device 1000. For example, the power supply 1050 may include a power management integrated circuit (PMIC). In an embodiment, the power supply 1050 may supply power to the display device 1060.

The display device 1060 may display images in response to image data signals and/or control signals from the processor 1010. The display device 1060 may be connected to other components through the buses or other communication links.

Aspects of some embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the claims, and their equivalents.

What is claimed is:

1. A display device comprising:
a sensor unit including first sensors and second sensors; and
a sensor driver configured to control the sensor unit, wherein the sensor driver includes:
a change rate calculator configured to calculate a first mutual capacitance of the sensor unit, and calculate a change rate corresponding to the first mutual capacitance; and
a threshold calculator configured to generate a threshold by applying the change rate to a reference threshold,
wherein the change rate refers to an increment or decrement of the first mutual capacitance at an external temperature of the display device as compared with a second mutual capacitance at a room temperature.

2. The display device of claim 1, wherein the reference threshold is a reference for determining a touch at a room temperature, and
wherein the threshold is a reference for determining a touch at an external temperature of the display device.

3. The display device of claim 1, wherein the sensor driver further includes a temperature measurer,
wherein the temperature measurer is configured to measure an external temperature of the display device, and
wherein the external temperature is output to the change rate calculator and the threshold calculator.

4. The display device of claim 2, wherein, based on the external temperature being higher than the room temperature, the threshold is larger than the reference threshold.

5. The display device of claim 4, wherein a degree to which the threshold is large as compared with the reference threshold is equal to the change rate.

6. The display device of claim 2, wherein, based on the external temperature being lower than the room temperature, the threshold is smaller than the reference threshold.

7. The display device of claim 6, wherein a degree to which the threshold is small as compared with the reference threshold is equal to the change rate.

8. A method of operating a display device including a sensor unit including first sensors and second sensors, the method comprising:

calculating a mutual capacitance corresponding to each of external temperatures and calculating a change rate corresponding to each of the external temperatures during a test period;
measuring an external temperature during an operation period after the test period; and
calculating a threshold by applying, to a reference threshold, a change rate corresponding to the measured external temperature.

9. The method of claim 8, wherein the calculating of the mutual capacitance corresponding to each of the external temperatures and calculating of the change rate corresponding to each of the external temperatures during the test period includes:
setting the external temperature as a start temperature;
calculating a mutual capacitance of the sensor unit at the external temperature;
comparing whether the external temperature is a highest temperature after the mutual capacitance of the sensor unit is calculated; and
calculating a change rate corresponding to each of the external temperatures when the external temperature is the highest temperature.

10. The method of claim 9, further comprising setting the external temperature as a temperature increasing by a step value based on the external temperature not being the highest temperature.

11. The method of claim 10, wherein the external temperatures include temperatures increasing by the step value from the start temperature to the highest temperature.

12. The method of claim 9, wherein the calculating of the mutual capacitance of the sensor unit includes:
calculating mutual capacitances between the first sensors and the second sensors; and
calculating an average value of the calculated mutual capacitances.

13. The method of claim 9, wherein the calculating of the change rate corresponding to each of the external temperatures includes calculating an increment or decrement of the mutual capacitance corresponding to each of the external temperatures as compared with a mutual capacitance at a room temperature.

14. The method of claim 9, wherein the calculating of the change rate corresponding to each of the external temperatures includes storing the calculated change rates in a memory.

15. The method of claim 8, wherein the reference threshold is a reference for determining a touch at a room temperature, and
wherein the threshold is a reference for determining a touch at an external temperature of the display device.

16. The method of claim 8, wherein, based on the measured external temperature being higher than a room temperature, the threshold is larger than the reference threshold.

17. The method of claim 16, wherein a degree to which the threshold is large as compared with the reference threshold is equal to the change rate.

18. The method of claim 8, wherein, based on the measured external temperature being lower than a room temperature, the threshold is smaller than the reference threshold.

19. The method of claim 18, wherein a degree to which the threshold is small as compared with the reference threshold is equal to the change rate.

20. An electronic device, comprising:
a processor to provide input image data; and a display device to display an image based on the input image data, wherein the display device comprises:

a sensor unit including first sensors and second sensors; and a sensor driver configured to control the sensor unit, wherein the sensor driver includes:

a change rate calculator configured to calculate a first mutual capacitance of the sensor unit, and calculate a change rate corresponding to the first mutual capacitance; and a threshold calculator configured to generate a threshold by applying the change rate to a reference threshold, wherein the change rate refers to an increment or decrement of the first mutual capacitance at an external temperature of the display device as compared with a second mutual capacitance at a room temperature.

* * * * *